Patented Dec. 20, 1927.

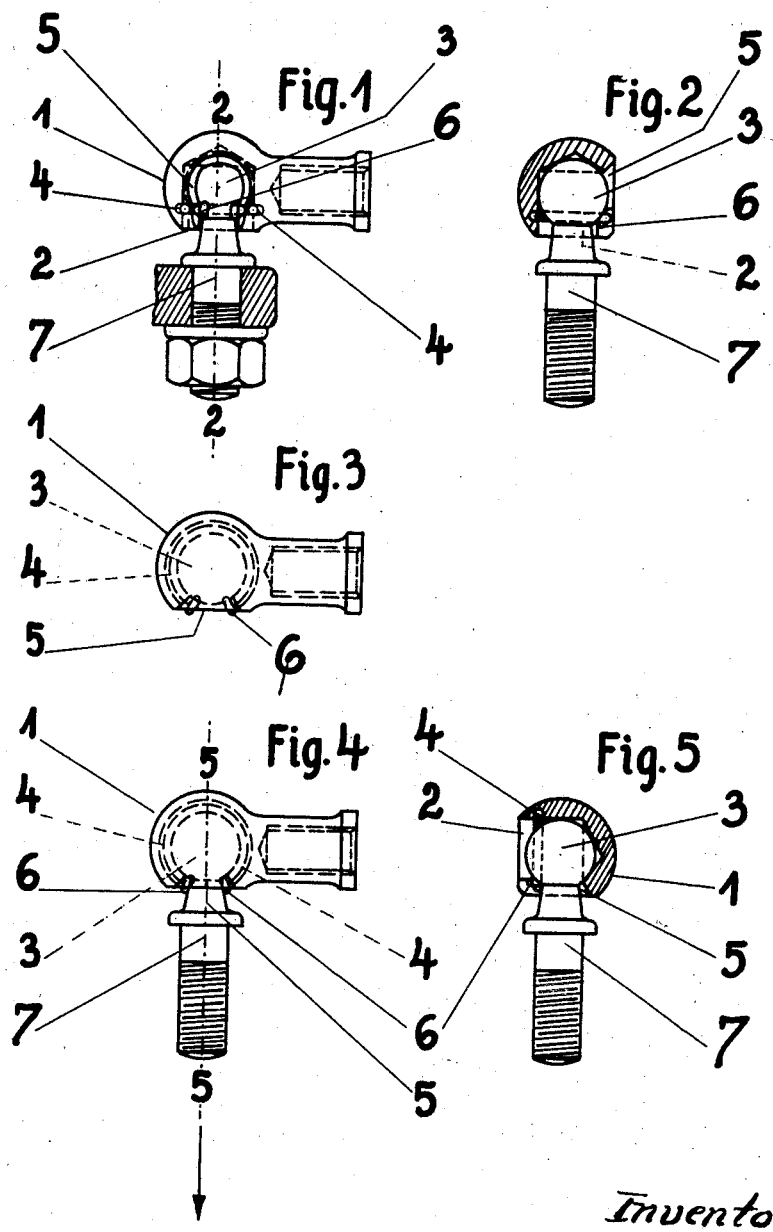

1,653,352

UNITED STATES PATENT OFFICE.

FRITZ FAUDI, OF DUSSELDORF-OBERKASSEL, GERMANY.

BALL-AND-SOCKET JOINT.

Application filed October 26, 1925, Serial No. 64,723, and in Germany May 19, 1925.

The present invention has reference to improvements in ball and socket joints, and relates more specifically to a joint of this general character especially adapted for use in the steering gear of motor vehicles.

As usual in this type of joint the housing or socket member is provided with an internal annular groove in which is seated a spring ring designed for clampingly surrounding the inserted ball member. Upon a strong, axially directed pull being exerted on the ball member it will overcome the clamping purchase of the spring ring and the ball will slip through the latter and out of its socket. This arrangement has the obvious disadvantage that the joint members can readily become inadvertently disconnected.

According to the present invention this drawback is effectively obviated by providing the housing or socket member, in addition to the usual opening for the introduction of the ball, with a second opening of smaller clearance and substantially at an angle of 90 degrees relative to the first opening and in marginal communication therewith. The ball is introduced in the usual manner into the first opening and its shank is then swung around into the second opening, the ball shank or bolt during this movement passing between the opposed open ends of the spring ring so that the latter is in a position laterally of the ball shank and no longer concentric therewith as in the prior constructions. The ball head is thus supported by the bearing faces of the housing and all strain is removed from the spring ring.

In order to make my invention more readily understood I will now describe it in detail in connection with the accompanying drawing, in which Fig. 1 is a side elevation of the improved ball joint, partly in section; Fig. 2 is a section on line 2—2 of Fig. 1; and Fig. 3 is a top view. These three figures illustrate the relative position of the parts for connecting or disconnecting the ball head and the socket. Figs. 4 and 5 show the joint after the ball member has been turned through 90° into its final operative position, Figure 5 being a section on line 5—5 of Fig. 4.

The housing 1 is provided in the well known manner with the opening 2 for the introduction of the ball head 3 which latter is supported by the spring ring 4. Laterally of this opening 2 the housing 1 is provided with the additional opening 5. These two openings 2 and 5 are mergingly arranged at substantially right angles to one another and the second opening 5 is of somewhat smaller clearance than the opening 2. The two ends of the split spring ring 4 are enlarged to form buttons 6 for the purpose of preventing a relative displacement of the ring in its seat groove.

The joint parts are assembled in the usual manner, the ball head being inserted into the opening 2 of the housing during which act of insertion the spring ring first opens sufficiently to let the ball pass therethrough and then clampingly closes beneath it, as shown in Figs. 1 to 3. Thereupon the ball extension 7 is turned through substantially 90° into the position shown by Fig. 4. During this movement the shank or bolt 7 of the pin passes between the two opposed end buttons 6 which yield and spread apart to permit such angular movement of the shank. After the latter has been moved into the smaller opening, the ring 4 will contract again to retain the ball head in the new and final position. The ball is now supported in the direction of operative pull (as indicated by the arrow in Fig. 4) solely by the bearing surfaces of the housing 1 which extend downwardly around and beyond the middle zone of the ball head, so that no stress is placed on the spring ring.

What I claim is:

1. In a ball and socket joint of the type set forth, in combination, a ball member having a shank, a housing adapted to journal said ball member and having an internal annular groove, an expansible split spring ring seated in said groove, said housing having a wall opening for the introduction thereinto of said ball member, and a second wall opening in said housing laterally of and in open communication through a connecting passage with the first opening for journaling said ball member in its operative position, the said second opening being of smaller clearance than the first opening to prevent removal of the ball therethrough while receiving the shank and permitting the same to swing between said openings, the split of said spring ring being arranged in line with the passage between said two openings and normally sufficiently closed to cause the ends of the ring to bear upon and obstruct the movement of the shank in the passage, said ends of the ring adapted to spread under a predetermined pressure of the shank and thereby permit of the passage of the shank through said split portion of the ring for movement from one opening to the other.

2. In a ball and socket joint according to claim 1, the feature that the split spring ring is provided with end portions enlarged with respect to the width of its seat groove for preventing shifting of the spring ring in its seat groove and maintaining its split portion in alinement with the passage between the openings.

In testimony whereof I affix my signature.

FRITZ FAUDI.